(12) United States Patent
Yoshida

(10) Patent No.: US 6,883,069 B2
(45) Date of Patent: Apr. 19, 2005

(54) CACHE CONTROL DEVICE AND MANUFACTURING METHOD THEREOF

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 279 days.

(21) Appl. No.: 10/345,952

(22) Filed: Jan. 17, 2003

(65) Prior Publication Data

US 2004/0006670 A1 Jan. 8, 2004

(30) Foreign Application Priority Data

Jul. 5, 2002 (JP) .................................. 2002-197817

(51) Int. Cl.$^7$ ............................................. G06F 12/08
(52) U.S. Cl. ............................................. 711/135
(58) Field of Search .......................... 711/118, 128, 711/130, 133, 135; 714/42, 763, 764, 6

(56) References Cited

U.S. PATENT DOCUMENTS 5,784,394 A * 7/1998 Alvarez et al. ............. 714/800
2003/0188219 A1 * 10/2003 DeRuiter et al. .............. 714/6

FOREIGN PATENT DOCUMENTS

JP 6-4336 1/1994
JP 8-221215 8/1996

* cited by examiner

Primary Examiner—Hiep T. Nguyen
(74) Attorney, Agent, or Firm—Staas & Halsey LLP

(57) ABSTRACT

A cache control device comprises a command control section 43 for receiving a cache deterioration report and generating a cache flush mode initiation signal which performs degeneration of the cache 44, a software interrupt section 52 for interrupting the supply of commands from software in response to the cache flush mode initiation signal, a command generating section 53a for generating fetch requests in which cache data flushing occurs to the cache in response to the cache flush mode initiation signal, an address generating section 54 for generating addresses for flushing the cache data in response to the cache flush mode initiation signal, and a request counter 58 for specifying ways at which flushing of the cache will be performed, whereby degeneration is possible where different CPUs are mounted in the system, or where a CMP micro architecture is employed, without the necessity of changing the system hardware or OS, or making additions to the computer architecture.

18 Claims, 8 Drawing Sheets

CACHE CONTROL DEVICE AND MANUFACTURING METHOD THEREOF

BACKGROUND OF THE INVENTION

The present invention relates to a cache control device and method for, in an information processing device having a cache, degenerating the cache by means of hardware.

In a prior art cache control system, there are a method of performing degeneration by hardware and a method of performing degeneration by operating system software (OS).

FIG. 1 is a block diagram showing a prior art main frame structure as an example of hardware control. In the drawing, the main frame comprises a central processing unit (hereafter referred to as a CPU) 11 and a memory system 12. The CPU 11 includes a CPU core 13 and a cache 14 which are the command control section. The cache 14 is designed as a four-way set associative cache comprising four cache ways 141 to 144. The memory system 12 is provided with a memory control unit (MCU) 15 and memory 16.

The cache 14 is a high integration memory device, therefore bit errors can easily occur due to alpha rays. If the number of one-bit errors exceeds a set value, the way including the section where the bit error occurred or the cache 14 is disconnected before a multiple bit error can occur. However, in a store-in type cache, the cache data must firstly be flushed to the memory. Thereafter, the cache does not store new data in the way where the errors occurred. This series of operations is called cache degeneration.

In a main frame structure, degeneration control requests from the cache 14 are sent to the MCU 15, and the MCU 15 flushes data from the cache 14 into the memory 16. In a main frame in which the CPU 11, including the cache 14, and the memory system 12 have been basically simultaneously designed and developed, the operating specifications of the cache 14 and memory system 12 have been determined simultaneously, therefore degeneration control can also be performed from the MCU 15.

FIG. 2 is a block diagram illustrating cache degeneration in a prior art open system, as an example of software control. This example is of a case where cache degeneration control is performed by an operating system (OS) operated by software or firmware.

Specifically, if a one bit error occurs, it is reported to the software, and the software initiates degeneration control in response thereto. For example, if data from all ways in the cache are flushed by such software control, the OS firstly issues the read addresses of data not existing in the cache to create a cache miss. As a result, although the OS accesses the memory 26 and reads the data therein, in a store-in type cache, before writing the content of the memory 26 into the cache in order to update the data within the cache, the data from the way that includes the least recently used data (LRU) existing in the cache 24 must be flushed to the memory 26. For example, even in the case of a one bit error occurring, the data read out from the cache is corrected by an ECC circuit. In this way the data in the cache is flushed to memory and the content of the memory updated prior to cache degeneration.

FIG. 3 is a block diagram illustrating cache degeneration in a multiprocessor system having a plurality of CPU cores 33 and 34 with respect to one cache 35. In this drawing, the multiprocessor system comprises a multiprocessor chip 31 and a memory system 32.

When the cache degeneration operation is performed, a cache degeneration request is issued via software from one of the CPU cores 33, and because the other CPU core 34 cannot access the cache, that CPU core must be placed in a suspended state. However, in order for the software to do this, it is necessary for there to be a software command for suspending either one of the CPU cores so that it does not access the cache; if there is no such command, it is difficult to completely flush the cache data.

When simultaneously developing a CPU 11 and memory system 12 as in a mainframe, there are no problems associated with conforming the operating specifications of the cache 14 and memory 16, so the cache can be flushed from the system side (MCU).

However, in an open system, because the CPU21 and memory system 22 are designed and developed separately, different CPUs may be mounted in the same memory system, or conversely the same CPUs may be mounted in different memory systems. In recent years, there has been a tendency for the operating frequencies of CPUs to gradually increase, thus the difference in CPU operating frequencies with respect to memory system and I/O operating frequencies has widened, and conversion of CPUs to faster models is repeatedly performed.

In open systems which have been developed with a view to operating under memory systems of a variety of scales, the memory system does not control the flushing of the cache, rather this is most often performed by the OS software.

In order to perform degeneration operations by means of the OS as above, the software or firmware must determine the cache structure, i.e. the cache size and number of ways. Also, where the cache is flushed by software, the cache control section must know by what algorithm the way from which the cache data is to be flushed must be selected.

That is, as described above, where only the CPU 21 is changed, without the memory system 22 being changed, the software or firmware must be changed when the cache size, number of ways and cache control algorithm of the CPU are changed, creating complex problems.

Further, in the case of a structure where a plurality of CPU cores share one cache as in the multiprocessor system shown in FIG. 3, when flushing data within the cache 35 to the memory system 32 by means of software or firmware, while data from the cache 35 is being flushed in response to a command from one CPU core 33, the other CPU core 34 must inhibit commands so that no effective data is passed to the cache 35.

However, in architecture which cannot issue a transition instruction to a wait state so that the CPU core inhibits commands, by means of software or firmware, since command inhibition control is not possible, as a result complete flushing of the cache data is difficult, hence the problem that degeneration of the cache is impossible.

In other words, in the case of architecture which cannot issue an instruction to a wait state so that a CPU core inhibits the issuance of commands, while one CPU core 33 is degeneration controlling the cache 35 via software, the other CPU core 34 could conceivably be accessing the memory. Hence, when performing degeneration which prohibits usage after flushing to the memory has finished, the data of a request from the other CPU core may also be stored in the way which must be degenerated.

SUMMARY OF THE INVENTION

An object of the present invention, in light of the above problems of the prior art, provides a cache control device which performs degeneration control of the cache by means of the CPU hardware, without changing the software or firmware and without depending on a combination of the memory system and CPUs.

Another object of the present invention is to provide a cache control device which makes degeneration of the cache possible in a multiprocessor chip by means of software or firmware in architectures that cannot issue transition instructions to a wait state so that the CPU inhibits the issuance of commands.

In order to achieve the above objects, the cache control device provided by one embodiment of the present invention comprises a software interrupt section for interrupting the supply of commands from software in response to a cache flush mode initiation signal output from a command control section, a command generating section for generating fetch requests for executing flushing of cache data to the cache in response to the cache flush mode initiation signal, a request counter for issuing fetch requests to all of the cache, and a flush address generating section for generating addresses in order to flush cache data in response to the cache flush mode initiation signal.

By means of the above, the supply of software commands is interrupted in response to the cache flush mode initiation signal, memory access and the flush way of the cache are specified by hardware, and flushing of the cache data is executed, therefore degeneration control without changing the software or firmware, or being dependent on a combination of the memory system and CPU is possible.

According to another embodiment of the present invention, a cache control device is provided in which, in the first embodiment, the central processing unit is a multiprocessor chip that provides a plurality of CPU cores with respect to one cache, and one of the CPU cores comprises a command control section, a software interrupt section, a cache flush request generating section, and a flush address generating section.

By means of the above, even if the CPU is a multiprocessor chip with an architecture that cannot issue a transition instruction to a wait state so that the CPU cores inhibit the issuing of commands by means of software or firmware, reliable execution of cache degeneration is possible.

BRIEF DESCRIPTION OF THE DRAWINGS

These and other features, aspects and advantages of the present invention will become better understood with reference to the following description, appended claims and accompanying drawings wherein

DETAILED DESCRIPTION OF THE PREFERRED EMBODIMENTS

Figure 1:
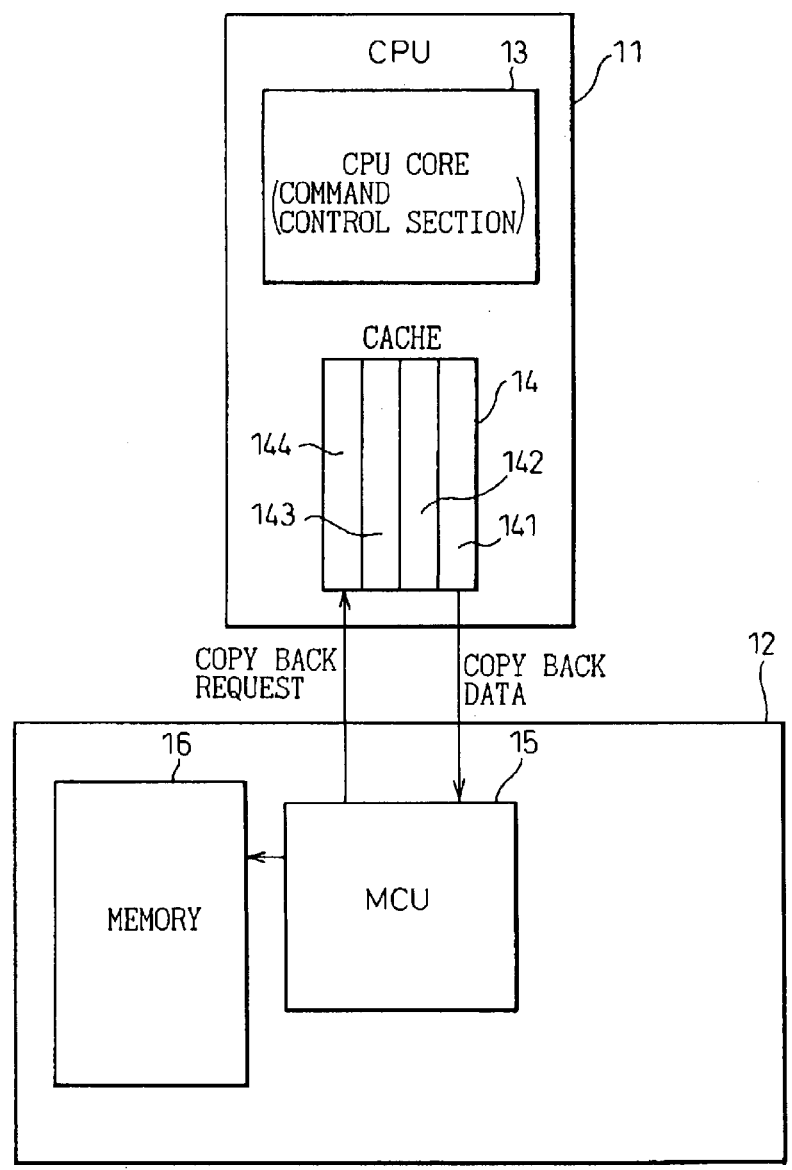
FIG. 1 is a block diagram showing the structure of a prior art main frame as an example of hardware control.
Figure 2:
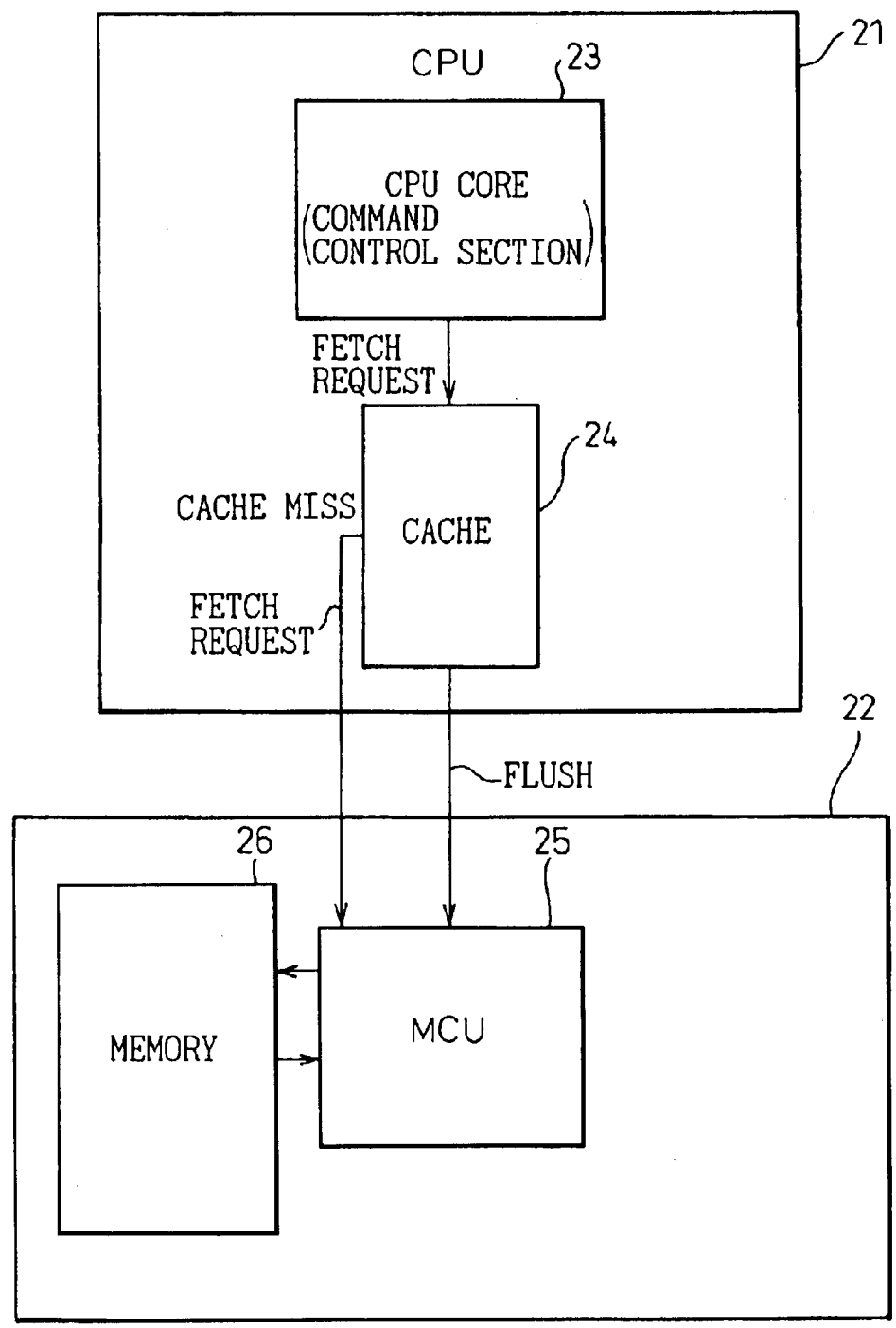
FIG. 2 is a block diagram illustrating cache degeneration in a prior art open system as an example of software control.
Figure 3:
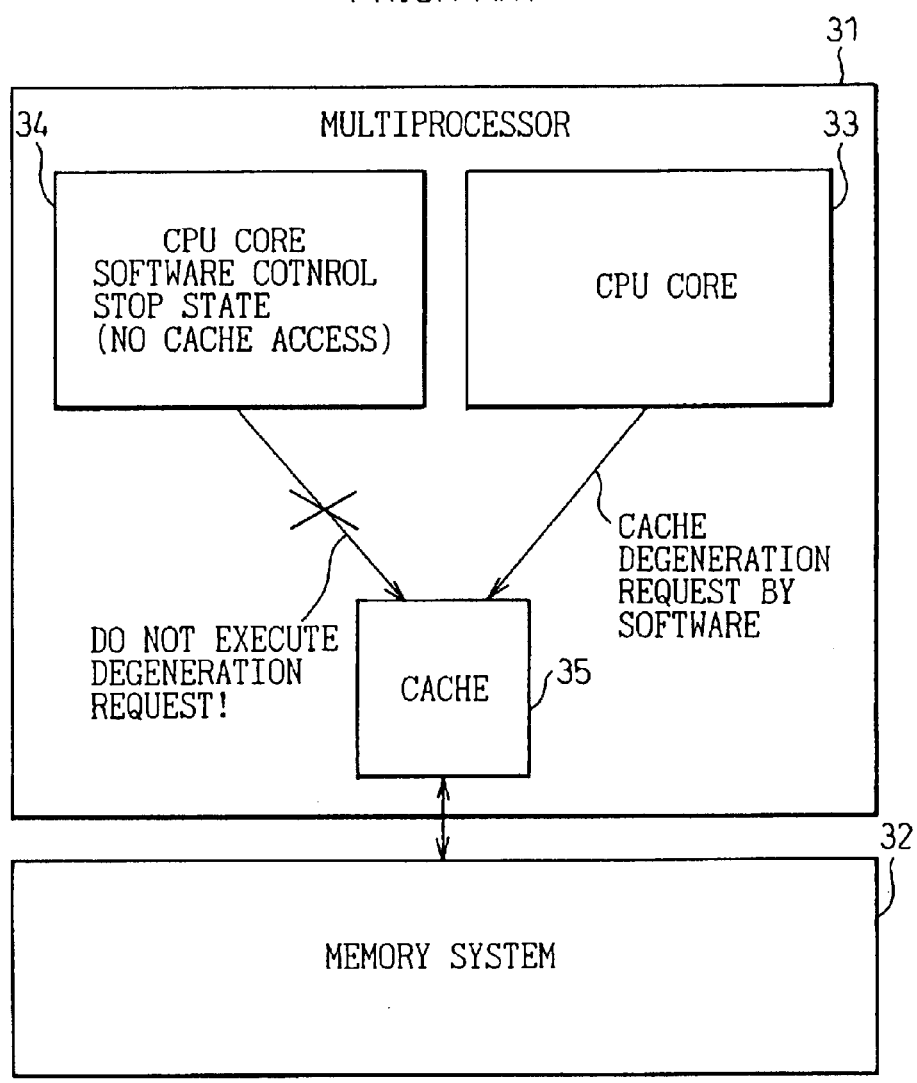
FIG. 3 is a block diagram illustrating cache degeneration in a prior art open system type multiprocessor system.
Figure 4:
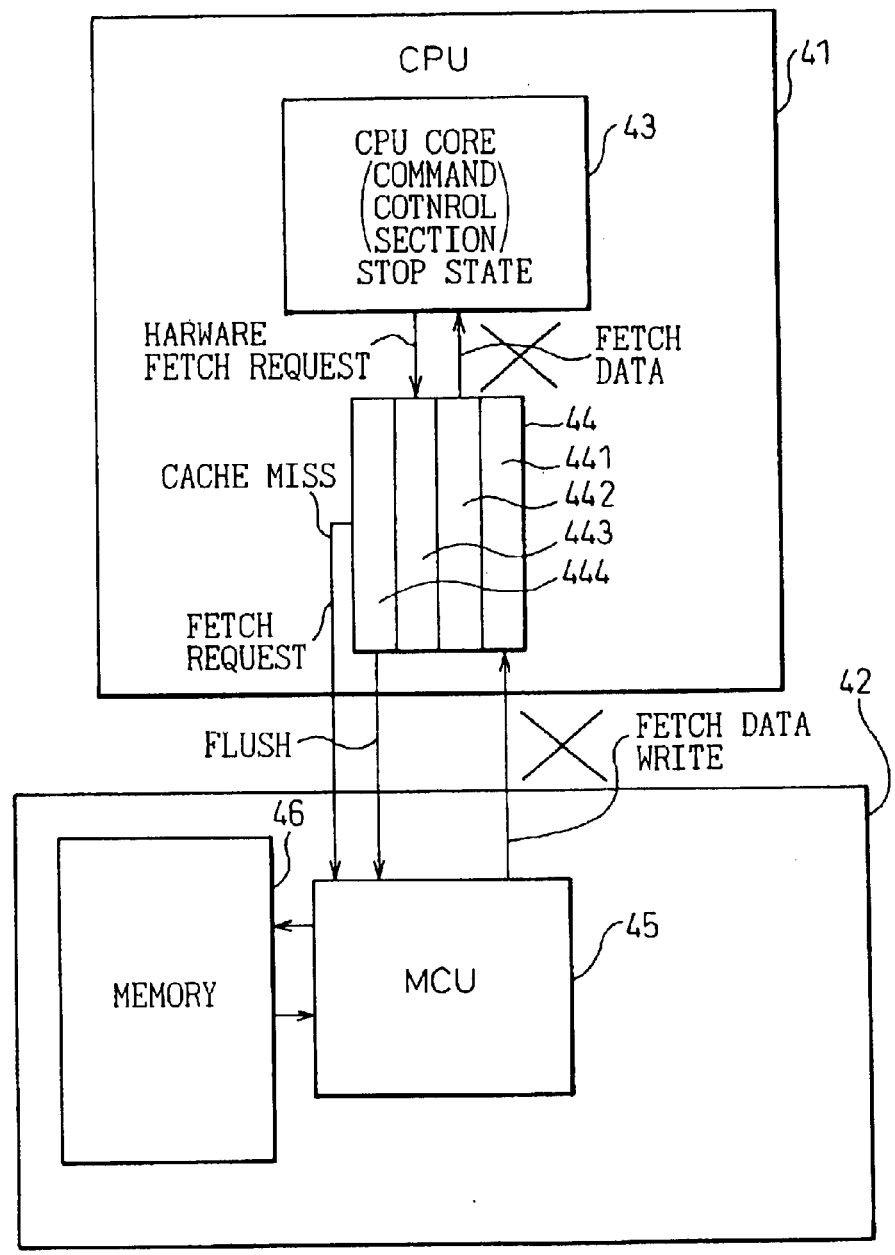
FIG. 4 is a block diagram showing part of the structure of a degeneration control device according to a first embodiment of the present invention.

FIG. 4 is a block diagram showing part of the structure of a degeneration control device according to a first embodiment of the present invention. In the drawing, the degeneration control device is part of an information processing device that includes a central processing unit (hereunder referred to as CPU) 41 and a memory system 42.

The CPU 41 includes a CPU core 43 which is the command control section and a cache 44. The cache 44 is designed as a set associative type comprising four ways 441 to 444 for example. The memory system 42 comprises a memory control unit (MCU) 45 and a memory 46.

In the present embodiment, degeneration control of the cache 44 is performed by hardware instead of software or firmware.

The operation of the present embodiment will be briefly explained next.

If a count value of a cache error frequency counter (not shown) exceeds a fixed number, a cache degeneration request is sent to the CPU core 43.

Once the degeneration request for the cache 44 is sent, fetching of software commands is stopped and the CPU core 43 is placed in a stop state so that it does not execute any more software commands. Next, a cache miss is generated from the CPU core 43 by means of hardware, and a number of fetch requests are generated with respect to an initial address that specifies an access prohibited region of the memory 46. The address is changed so that the fetch requests are issued with respect to the entire cache. Also, a request counter is provided to count the number of fetch requests. The address that generates the cache miss is an address that does not exist in the cache 44. When a cache miss occurs, the hardware fetch request is sent to the memory 46 via the MCU 45 in the memory system 42. However, since the above initial address is an address specifying an access prohibited region of the memory 46, data cannot be read from the memory 46. At this time the CPU core 43 ignores the detected access prohibition exception error report.

Normally, data is flushed to memory via the MCU 45 from the LRU (least recently used) way of the cache 44, and then written back to the memory 46. During cache degeneration, the highest two bits on the fetch request counter are sent to the cache section and the ways to be flushed are determined by those two bits, so that flushing of the cache is definitely performed for all ways. Data flushing of the cache 44 is carried out in this way.

Since the addition of fine control circuitry is omitted, in the present embodiment flush requests are issued not only to the error way in the cache, but to all regions in the cache at once. This is known as cache flush.

Figure 5:
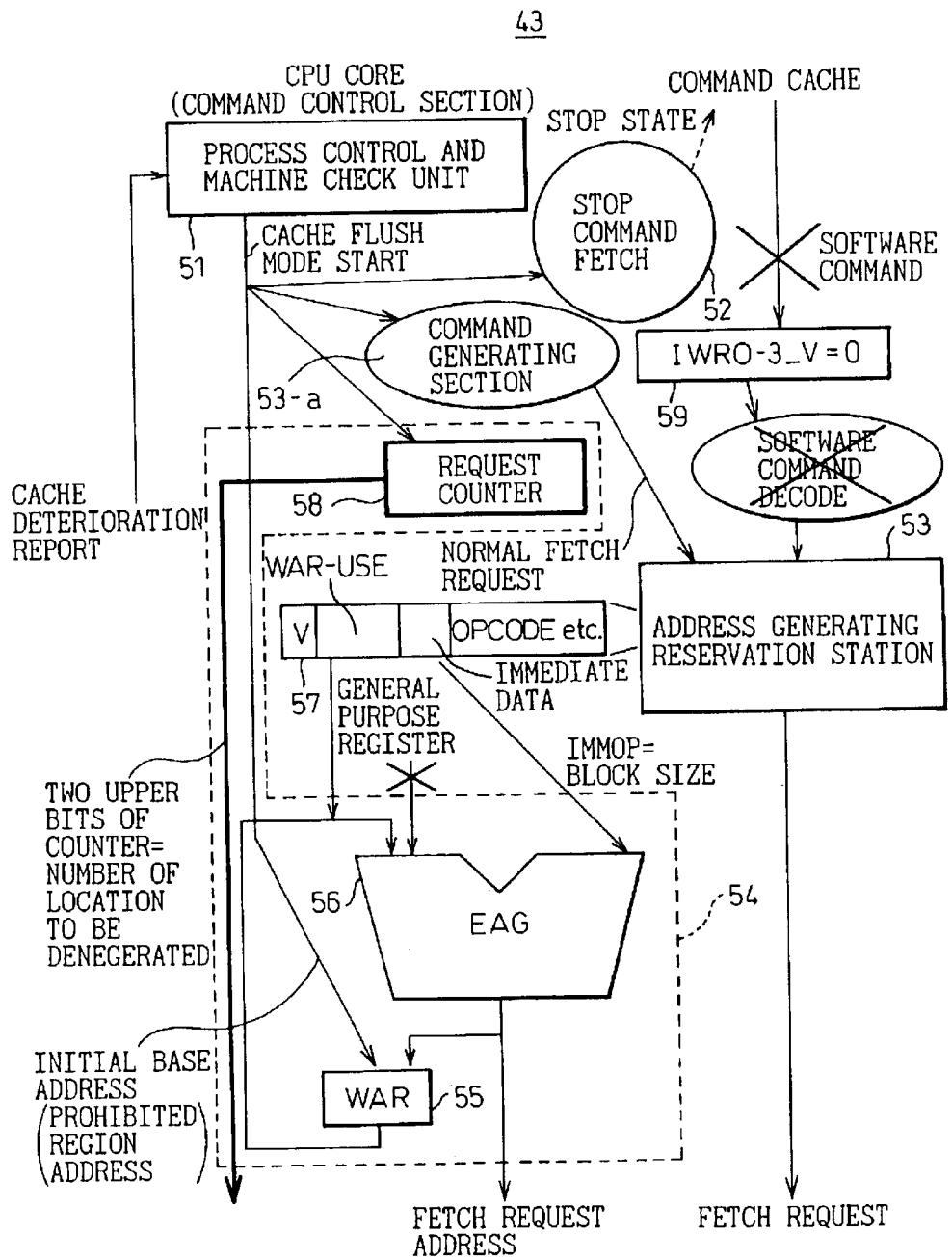
FIG. 5 is a block diagram showing a detailed structure of the CPU core in the degeneration control device shown in FIG. 4.

FIG. 5 is a block diagram showing the detailed structure of the CPU core 43 in the degeneration control device shown in FIG. 4. In the drawing, the CPU core 43 comprises a command control section 51 for receiving a cache deterioration report and generating a cache flush mode initiation signal which performs degeneration of all of the regions of the cache 44, a software interrupt section 52 for interrupting the supply of commands from software in response to the cache flush mode initiation signal, a command generating section 53a for repeatedly generating fetch requests to the cache in response to the cache flush mode initiation signal, a flush address generating section 54 for generating addresses for flushing the cache data in response to the cache flush mode initiation signal, and a request counter 58 for generating fetch requests to the entire cache and indicating ways to be flushed.

The flush address generating section 54 comprises a work address register (WAR) 55 and an effective address generator (EAG) 56.

The work address register 55 sends the cache miss generated by the command control section 51 in response to the cache deterioration report from the cache 44 (FIG. 4) and stores the initial address specifying an access prohibited region of the memory 46.

The effective address generator 56 generates the address of the memory access prohibited region based on the content of the work address register 55, and updates the content of the work address register 55 by means of the generated address.

The flush request command generating section specifies a flag WAR-USE that determines whether the output of the work address register 55 has been input to the effective address generator 56, and the data amount (number of bytes per block) flushed per fetch with respect to the cache 44, by means of immediate data, and cues and stores in the reservation station 53 a command 57 that includes operand codes OPCODE and the like. A validity bit V, in which "1" indicating validity where the command 57 has not yet been executed becomes "0" indicating invalidity when the command 57 has been executed, is included in the command 57.

The effective address generator 56, when the flag WAR-USE indicates that the output of the work address register 55 has been input to the effective address generator 56, adds the data of the work register, not the general use register, and the immediate data generated by the command control section, and generates a fetch request address (prohibited region address) for flushing data from the cache 44.

Although the fetch request for generating flushing of the cache by means of the command control section accesses the memory 46 at the fetch request address generated by the address generating section 54, this is a prohibited region address, therefore data cannot be read out from the memory 46. In this case the detected error signal is ignored during degeneration processing by the error detecting section.

Further, the request counter 58, for counting the number of times fetch requests that generate flushes are issued, is provided. When data is flushed in order to degenerate the cache 44, part of the count value of the request counter 58 is indicated as the way number which causes the flushing. The data flushed from the indicated way is stored in the memory 46 via the MCU 45. The cache 44 comprises four ways (ways 442 to 444) in the example of the drawing, and the way within the cache 44 which is to be degenerated is specified using the highest two bits output from the request counter 57.

Figure 6:
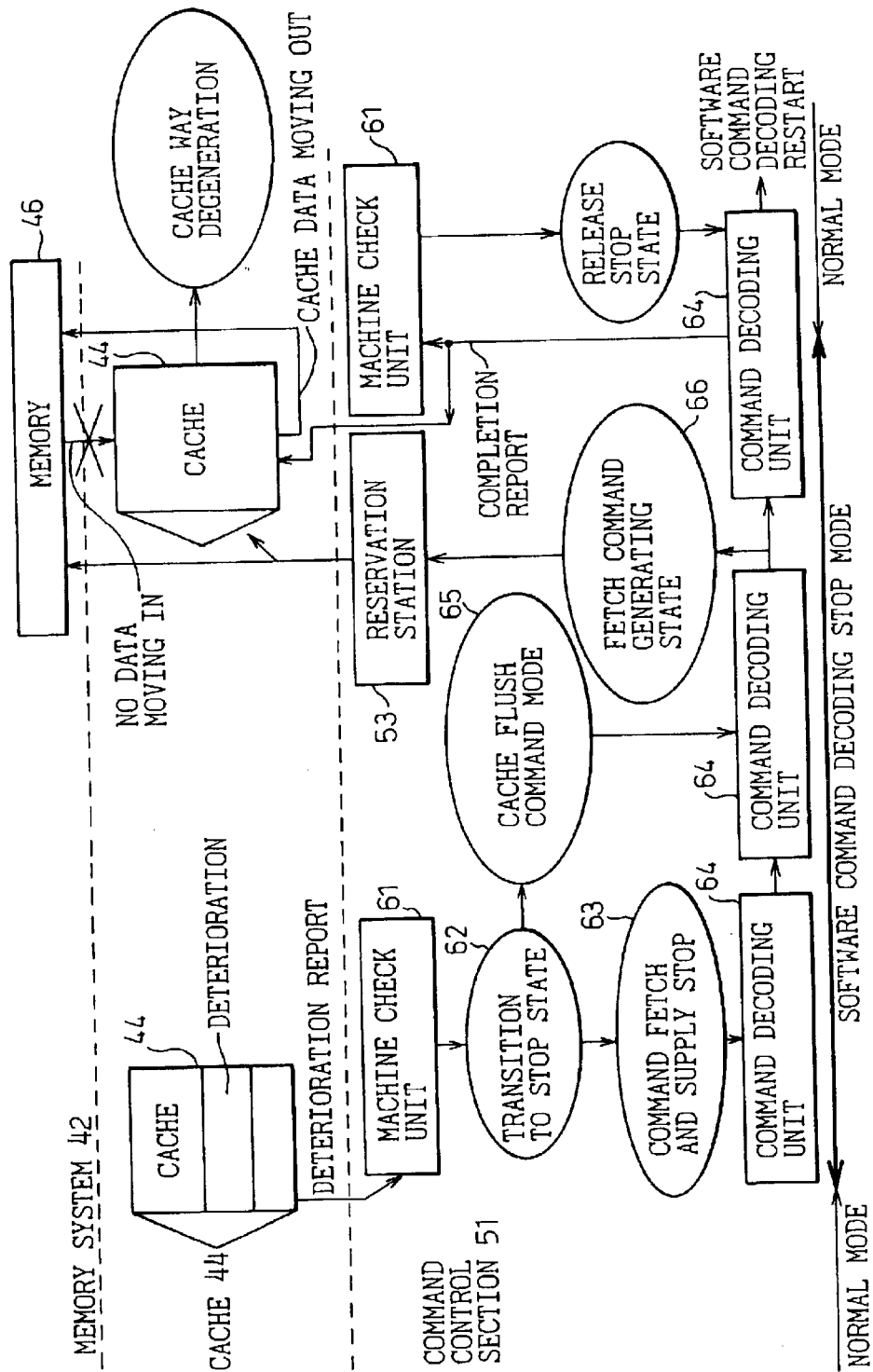
FIG. 6 is a flowchart illustrating transitions in the state of the degeneration control device shown in FIG. 4 and FIG. 5.

FIG. 6 is a flowchart illustrating transitions in the state of the degeneration control device shown in FIG. 4 and FIG. 5. In this drawing, the operations of the memory system 42, cache 44 and command control section 51 are shown going from left to right. As shown on the left of the drawing, in the normal mode where there is no degeneration operation of the cache 44, if deterioration of part of the cache 44 occurs, a deterioration report is sent to a machine check unit 61 within the command control section 51. Then, the command control section 51 makes the transition to a stop state 62 that stops fetching of software commands. Thereby, the command control section 51 enters a state 63 where the supply and execution of software commands are stopped.

Thereafter the command control 51 advances to a cache flush command mode 65.

Next, the command control section 51 enters a fetch command generation state 66 by means of the hardware command generating section 53a for cache flushing, and a command for cache flushing generated by the hardware is stored in the reservation station 53. In the present embodiment, in order to simplify the operation, when cache flushing, all data in the cache is flushed.

Then, the fetch request is output to the cache 44 from the reservation station 53. The access prohibited region of the memory 46 is accessed, and a cache miss and cache flushing are generated. Also, because it is a prohibited region, data cannot be moved in from the memory 46. The generated address in the cache 44 and data from the way specified using the highest two bits of the request counter for counting the number of fetch requests for flushing are flushed to the memory 46.

A command decoding unit 64 sends a completion report to the machine check unit 61 and the cache 44 in response to completion of flushing of the cache. The cache section receives this and separates the way that includes the area where the error was detected so that it no longer stores data, and the software command fetch stop state of the command control section 51 is released in the machine check unit 61, so that the process changes to a normal mode where software command can be executed.

Figure 7:
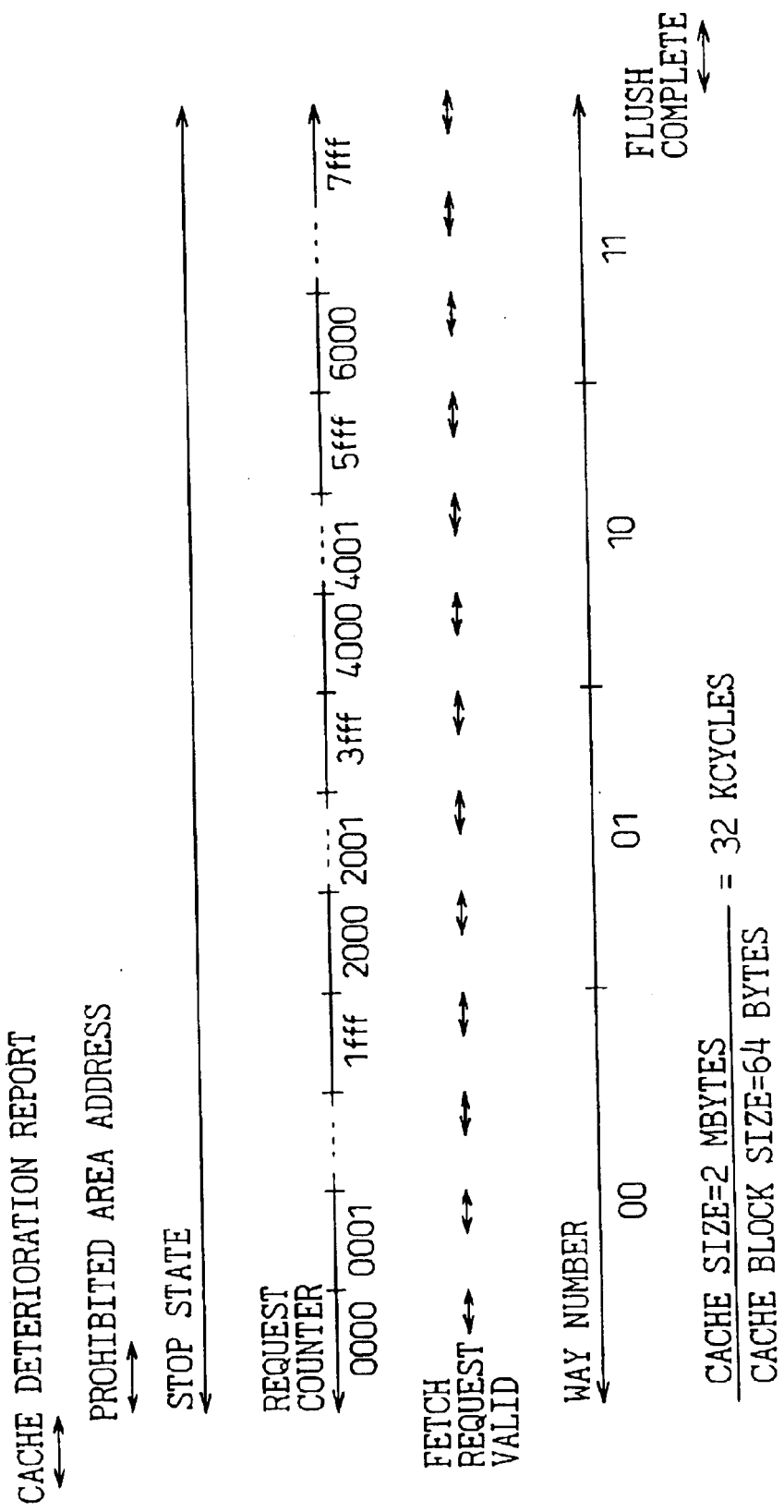
FIG. 7 is a drawing showing way numbers in a cache indicated by a count value of a request counter in the degeneration control device shown in FIG. 4 and FIG. 5.

FIG. 7 is a drawing showing the way numbers in a cache indicated by a count value of a request counter in the degeneration control device shown in FIG. 4 and FIG. 5. As described above, when a cache deterioration report is generated, the address of an access prohibited region in the memory 46 is generated, and a cache flush mode initiation signal is generated by the command control section 51. After cache flush mode initiation, the request counter 57 counts the number of fetch requests issued for flushing cache data. In the drawing, this count value is displayed in hexadecimal notation. In the present embodiment the cache is a four-way set associative type cache and the highest two bits of the binary count value are taken as the numbers of the way for flushing. The total capacity of the cache 44 is 2 MB, the capacity of one block being 64 bytes, and the number of fetch requests being 32,000. When the command 57 created by the hardware (FIG. 5) is sent to the cache, if the highest two bits of the output of the request counter 58 are 00, way 1 is flushed, if the highest two bits are 01, way 2 is flushed, if the highest two bits are 10, way 3 is flushed, and if the highest two bits are 11, way 4 is flushed.

The operation of the degeneration control device in the first embodiment described above is as follows.

When the value of the cache error frequency counter exceeds a fixed number, a degeneration request for one or all of the ways of the cache 44 is sent to the command control section 51 in the CPU core 43. This triggers a transition to a CPU stop state that interrupts the supply of commands from the software. After this, memory fetch requests are issued a number of times by the hardware decoder. At this time, in order to cause a cache degeneration miss so that data currently in the cache is written back to the memory 46 and prevent new data moving into the cache, a fetch request is issued to the address of the memory access prohibited region. The access prohibition exception detected at this time is ignored. Since the addition of fine control circuitry is omitted, flush requests are issued not only to the error way in the cache, but to all regions in the cache at once.

Regarding the memory addresses containing all of the cache size, firstly, when the command control section 51 in the CPU core 43 receives a request, the address of the memory access prohibited region is prepared as an initial base address in the work address register (WAR) 55, the block size (64 bytes in the example of FIG. 7) is specified in the immediate data, and the sum of the content of the work address register (WAR) 55 and the immediate data is generated by the effective address generator (EAC) 56. The issued fetch request address is reset in the effective address generator (EAG) 56 as the next base address, and added to the immediate data indicating the block size of the way to produce the next address. This operation is repeated only (cache content/cache way block size) times.

The way which is subjected to flushing is specified using the request counter that counts this frequency.

Figure 8:
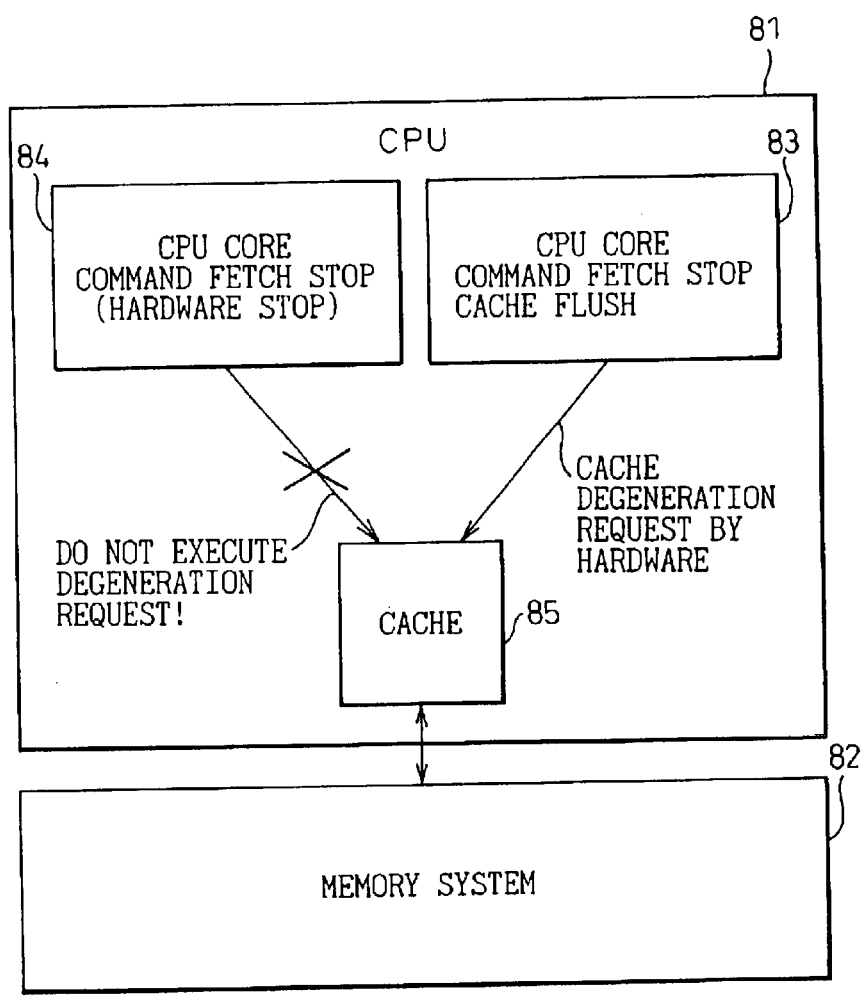
FIG. 8 is a block diagram showing the structure of a degeneration control device according to a second embodiment of the present invention.

FIG. 8 is a block diagram showing the structure of a degeneration control device according to a second embodiment of the present invention. In the drawing, this degeneration control device is also part of a data processing device including a CPU 81 and memory system 82.

The CPU 81 is a multiprocessor chip comprising two CPU cores 83 and 84 and a cache 85, only one CPU core 83 of these two CPU cores comprising a command control section 51, software interrupt section 52, a command generating section 53a for generating fetch requests for flushing cache data, a degeneration flush address generating section 54, and a request counter 58 for specifying ways to be flushed.

In a system having this type of multiprocessor chip (CMP) structure, in this case where cache degeneration is performed by the CPU, the degeneration request is sent from the cache 85 to both of the CPU cores 83 and 84, and the CPU cores 83 and 84 enter a stop state. Also, only one CPU core 83 performs control as explained in the first embodiment and degenerates the cache after flushing it, sends a completion report to the other CPU core 84, and restarts commands by means of the software. In the present invention all operations up until degeneration are performed using only hardware, without the intervention of software. The supply of commands from the CPU cores are suspended and restarted by hardware control, therefore it is possible to flush the cache of a multiprocessor chip (CMP) even with an architecture in which a software wait state is not provided.

Although the degeneration control device in the present embodiment is provided within the CPU core, it is also possible to perform degeneration control with respect to the cache with the degeneration control device provided outside the CPU core.

As described above, according to the present invention, by adding hardware resources such as a cpu command decoding section and command generating section, cache degeneration is possible where different cpus are mounted in the system, or where cmp micro architecture is employed, without changing the system hardware or os, and without the necessity of changing the system hardware or os, or making additions to the computer architecture.

What is claimed is:

1. A cache control device comprising: a command control section for receiving a deterioration report of a cache in a central processing unit and generating a cache flush mode initiation signal; a software interrupt section for interrupting a supply of commands from software in response to the cache flush mode initiation signal; a flush command generating section for repeatedly generating fetch requests for executing flushing of cache data to the cache in response to the cache flush mode initiation signal; and a flush address generating section for generating addresses for flushing cache data in response to the cache flush mode initiation signal.

2. The cache control device as claimed in claim 1, wherein the flush command generating section comprises a request counter for counting the number of times fetch requests are issued for cache flushing in the cache flush mode, and when a number of fetch requests is sufficient to complete flushing of all data in the cache, the flush command generating section reports completion of flushing to the command control section and the cache.

3. The cache control device as claimed in claim 2, wherein the cache comprises a plurality of ways, and a way to be subject to flushing within the cache is specified using part of an output of the request counter.

4. The cache control device of claim 1, wherein the flush address generating section comprises a work address register and an effective address generator, and a memory access prohibited region address exceeding the size of the cache is stored in the work address register as an initial base address of the flush address.

5. The cache control device of claim 1, wherein fetch requests to an address obtained by adding the contents of a work register and immediate data are generated in the flush command generating section using a cache block size value as said immediate data.

6. The cache control device as claimed in claim 5, wherein, at the same time that each of the fetch requests is issued to a memory system, the work address register is updated by the address of the fetch request, and an address of a next fetch request is generated using the address of said fetch request.

7. The cache control device as claimed in claim 1, wherein the cache control device is a multiprocessor chip comprising a plurality of CPU cores corresponding to one cache, and a deterioration report of the cache is sent to all of the CPU cores.

8. The cache control device as claimed in claim 7, wherein flushing of cache data is performed by only one of the CPU cores in the multiprocessor chip by means of the cache flush command generating section and the flush address generating section, and the other CPU core interrupts execution of software commands.

9. The cache control device as claimed in claim 7, wherein, in the multiprocessor chip, when flushing of the cache data is completed by one of the CPU cores, a completion report is sent to the other CPU core, and each of the CPU cores restarts execution of software commands.

10. A cache control method for a central processing unit having a cache, comprising the steps of controlling command for receiving a deterioration report of the cache and generating a cache flush mode initiation signal; controlling software interruption for interrupting the supply of software commands in response to the cache flush mode initiation signal; controlling flush command generation for repeatedly generating fetch requests for executing flushing of cache data to the cache, in response to the cache flush mode initiation signal; and controlling flush address generation for generating addresses for flushing cache data in response to the cache flush mode initiation signal.

11. The cache control method as claimed in claim 10, wherein, in the flush command generating control, the number of times fetch requests are issued for cache flushing in the cache flush mode is counted, and when a number of fetch requests is sufficient to complete flushing of all data in the cache, completion of flushing is reported to the command control section and the cache.

12. The cache control method as claimed in claim 11, wherein the cache comprising a plurality of ways, and a way to be subjected to flushing within the cache is specified using part of an output of the request counter for counting the number of times fetch requests are issued.

13. The cache control method as claimed in claim 12, wherein the flush address generating control stores a memory access prohibited region address exceeding the size of the cache in the work address register as an initial base address of the flush address.

14. The cache control method of claim 10, wherein the flush command generating control generates fetch requests to an address obtained by adding the contents of a work register and immediate data using a cache block size value as said immediate data.

15. The cache control method as claimed in claim 14, wherein, at the same time that each of the fetch requests is issued to a memory system, the work address register is updated by the address of the fetch request, and an address of a next fetch request is generated using the address of said fetch request.

16. The cache control method as claimed in claim 10, wherein the cache control device is a multiprocessor chip comprising a plurality of CPU cores corresponding to one cache, and a deterioration report of the cache is sent to all of the CPU cores.

17. The cache control method as claimed in claim 16, wherein flushing of cache data is performed by only one of the CPU cores in the multiprocessor chip by means of the cache flush command generating control and the flush address generating control, and the other CPU core interrupts execution of software commands.

18. The cache control method of claim 10, wherein, in the multiprocessor chip, when flushing of the cache data is completed by one of the CPU cores, a completion report is sent to the other CPU core, and each of the CPU cores restarts execution of software commands.

* * * * *